UNITED STATES PATENT OFFICE.

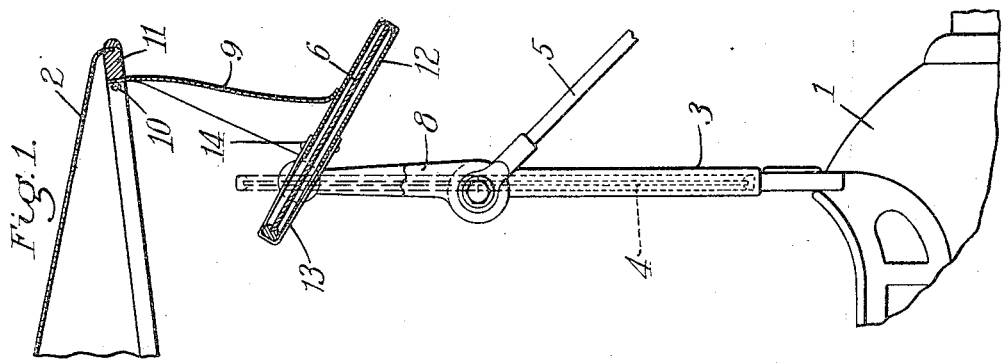
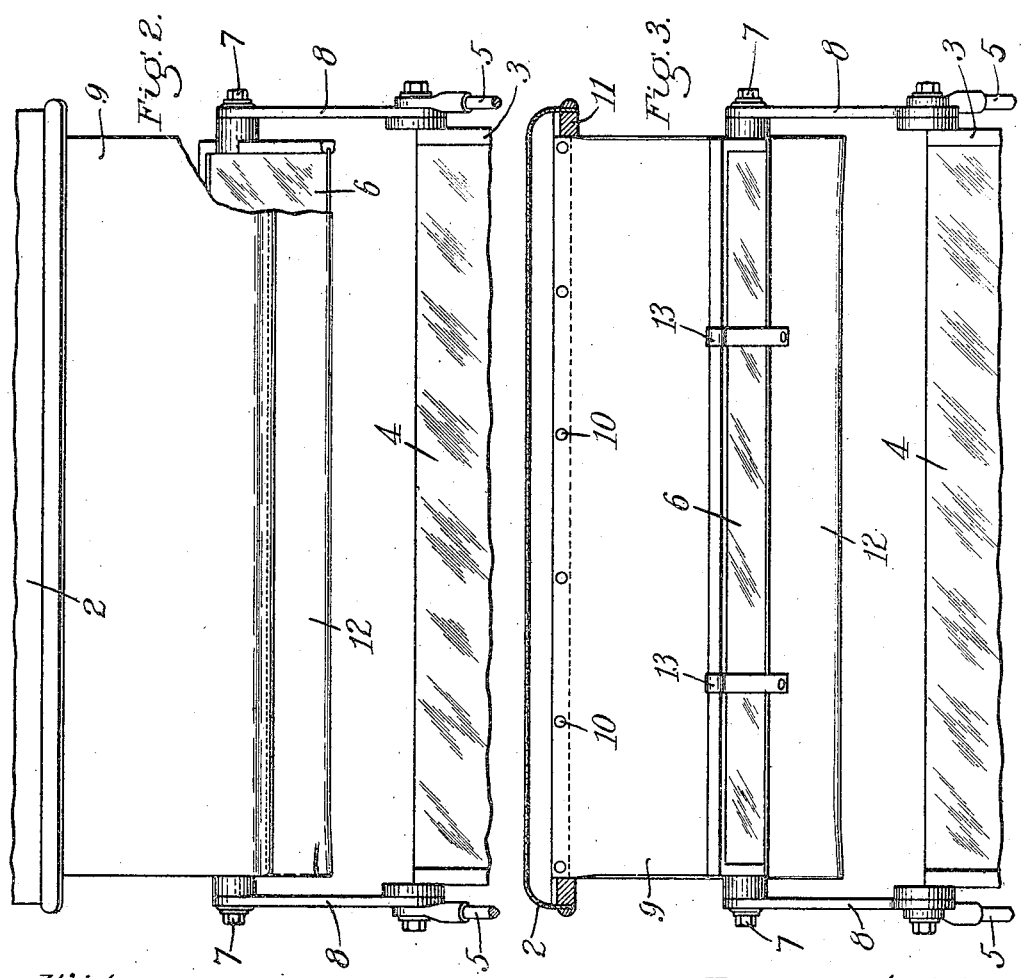

ALBERT C. SCHULZ, OF BRIDGEPORT, CONNECTICUT, ASSIGNOR TO THE LOCOMOBILE COMPANY OF AMERICA, OF BRIDGEPORT, CONNECTICUT, A CORPORATION OF WEST VIRGINIA.

SHIELD.

1,259,784.

Specification of Letters Patent.   Patented Mar. 19, 1918.

Application filed January 31, 1913.   Serial No. 745,384.

*To all whom it may concern:*

Be it known that I, ALBERT C. SCHULZ, a citizen of the United States, and a resident of Bridgeport, county of Fairfield, State of Connecticut, (whose post-office address is care of The Locomobile Company of America, Bridgeport, Connecticut,) have invented an Improvement in Shields, of which the following description, in connection with the accompanying drawings, is a specification, like characters on the drawings representing like parts.

This invention relates to improvements in shields for automobiles and other vehicles. The invention will be best understood by reference to the following description when taken in connection with the accompanying illustration of one specific embodiment thereof, while its scope will be more particularly pointed out in the appended claims.

In the drawings:

Figure 1 is a side elevation partly in section showing a shield embodying one form of my invention applied to an automobile, a portion only of the top and the body of the automobile being shown.

Fig. 2 is a front elevation of the shield shown in Fig. 1; and

Fig. 3 is a rear elevation thereof.

Referring to the drawings, and to the illustrative embodiment of my invention therein shown, the front portion of the body of an automobile is shown at 1 and a portion of the top at 2. The automobile is shown as equipped with a common form of wind shield arranged transversely in front of the operator's seat. This wind shield consists of the upright supports 3 secured to the body 1 and carrying the lower transparent panel 4, diagonal braces 5 being employed to assist in supporting the same. Above the lower or fixed transparent panel 4, there is provided a second transparent panel 6, the same being hinged at 7 on the supports 8 so that it may be adjustably fixed either in the upright position indicated in dotted lines in Fig. 1, forming a continuation of the lower panel 4, or may be swung outwardly and held fixed in the full line position shown in Fig. 1. The latter is desirable in order to have an opening in the wind shield when driving in stormy weather, this providing a clear vision of the road, unobstructed by the accumulation of snow or rain on the panel. As ordinarily constructed the rain or snow is free to enter the opening between the cape top and the hinged top of the panel and strike the occupants of the vehicle. This is also aggravated by the tilting of the panel which increases the size of the opening.

In order to close the opening between the transparent shield and the vehicle top and particularly when the upper panel 6 is tilted into the position shown in Fig. 1, I have provided a storm shield 9 in the form of an apron or guard which may be of heavy fabric or any suitable weather-proof material. The upper edge of this is preferably detachably secured to the top as by means of a series of buttons 10 secured to the transverse frame member 11 of the top. The lower edge may be secured to the panel 6 in any desired manner. Herein it is attached as by sewing or otherwise to the fabric pocket 12, the latter shaped so as to incase the bottom side and lower edges of the panel 6. The pocket is held in position on the panel by any suitable means as by means of one or more straps 13. Each strap has one end fastened permanently to the pocket, the opposite end being passed around the uncovered portion and edge of the panel and secured to the upper edge of the pocket by any suitable means such as buckles or snap buttons 14.

The shield 9 can be readily placed in position by fastening it at the top to the buttons 10, slipping the pocket over the panel and securing the straps in position. When installed, it effectively closes the opening between the panel and the top. It can readily be removed by unfastening the straps, slipping the pocket off from the panel and unbuttoning the upper edge.

While I have herein shown and described for purposes of illustration one specific form of the invention, it is to be understood that the same is not limited to the constructional details shown or to the form and relative arrangement of parts, but that extensive deviations may be made therefrom without departing from the spirit of the invention.

Claims:

1. In a vehicle, in combination, a top, a front shield consisting of a fixed lower transparent panel, a hinged upper panel, a detachable shield between the top and the hinged panel comprising an apron removably fastened to the top, a pocket shaped to incase the bottom of the hinged panel, said apron being fastened to said pocket, and means for holding said pocket in position on said panel.

2. In a vehicle, in combination, a top, a front shield having a hinged transparent panel means for locking it in adjusted, inclined position and a detachable shield between the top and the panel comprising an apron and a pocket secured thereto, the latter adapted to be detachably fastened to said panel.

3. In a vehicle, in combination, a top, a wind shield having a lower panel portion with a relatively movable upper transparent panel at or about the level of the vision of the occupant of the vehicle, said panel being mounted to be tipped to open the space immediately in front of the occupant's line of vision, and a weather guard detachably secured to the tipped panel to close the space between the same and the top when the panel is open.

4. In a vehicle, in combination, a top, a wind shield frame transversely across the front of the body, a lower panel carried by said frame, an upper transverse panel adapted normally to stand in a substantially vertical position to close the space in front of the line of vision of the occupants of the vehicle, said panel being pivoted to swing about a horizontal axis and open the said space, means for securing the same in an open or closed position, and a curtain or apron secured to said top and having its lower edge adapted to be detachably secured to the said panel when opened whereby the curtain serves as a weather guard to close the space between the open panel and the top.

5. In a vehicle, in combination, a top, a wind shield frame transversely across the front of the body, a lower panel carried by said frame, an upper transverse panel adapted normally to stand in a substantially vertical position to close the space in front of the line of vision of the occupants of the vehicle, said panel being pivoted to swing about a horizontal axis and open the said space, means for securing the same in an open or closed position, a curtain or apron having its upper portion held to the top and its lower edge adapted to be detachably secured to said panel, and means for detachably securing the same comprising a fabric structure adapted to fit over the edge of said panel, and means for securing the structure thereto.

6. In a vehicle, in combination, a top, a wind shield having a lower panel and an upper transparent panel, the latter adapted normally to close the space in front of the line of vision of the occupant of the vehicle, but pivoted to swing and open said space to the vision of said vehicle occupants, a curtain connected to the top and having its lower edge adapted to be detachably secured to the upper panel when opened, and means for detachably securing the same thereto.

7. In a vehicle, in combination, a top, a wind shield having lower and upper panels, the upper panel being movable to open the space in front of the line of vision of the vehicle occupants, and a weather guard for the opening between the guard and the top, said guard being detachably secured to the panel.

8. In a vehicle, in combination, a top, a wind shield consisting of a lower panel, a hinged upper transparent panel, a detachable shield between the top and the hinged panel comprising an apron, means for fastening the same to the top, a pocket on the apron shaped to incase an edge of the panel, and means for holding the pocket in position on the panel.

9. The combination with a vehicle having a body, a top, a front shield having a fixed and a transparent hinged section, a removable guard, and means for adjusting the weather guard at will between the lower edge of the hinged section and the vehicle top to render the transparent section opaque above the line of vision.

In testimony whereof, I have signed my name to this specification, in the presence of two subscribing witnesses.

ALBERT C. SCHULZ.

Witnesses:
 WM. S. TEEL, Jr.,
 A. A. STEWART.